UNITED STATES PATENT OFFICE.

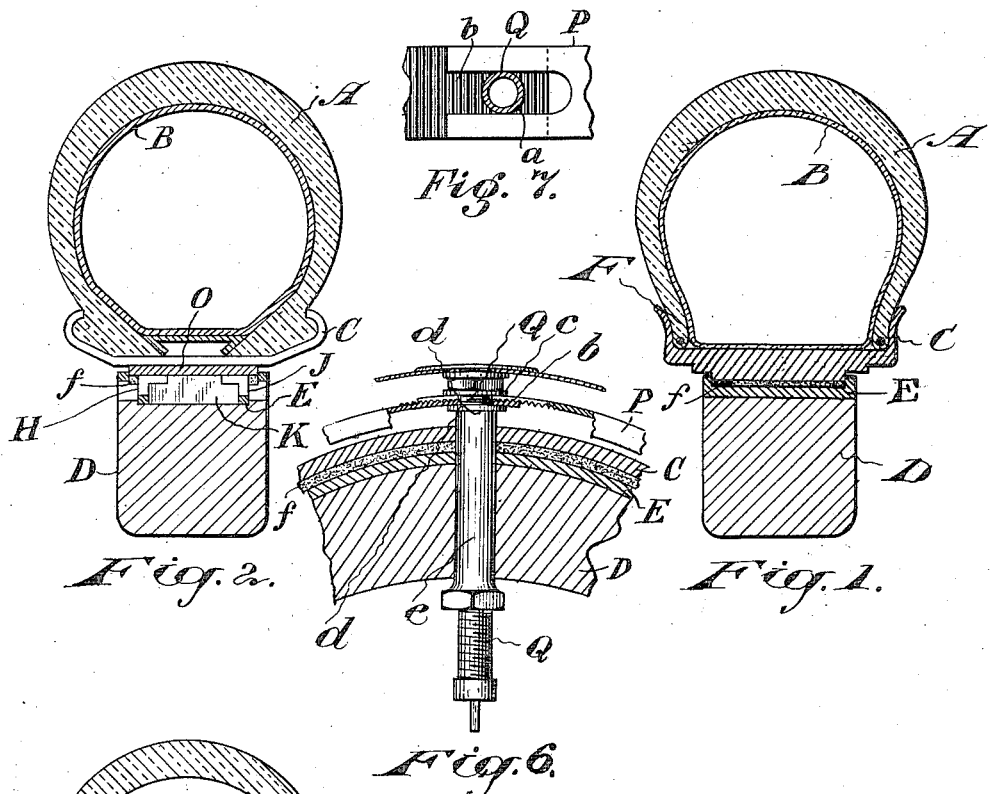

PERRY E. DOOLITTLE, OF TORONTO, ONTARIO, CANADA, ASSIGNOR, BY MESNE ASSIGNMENTS, TO DOOLITTLE RIM CO., LTD.

DEMOUNTABLE RIM.

998,880.            Specification of Letters Patent.      Patented July 25, 1911.

Application filed August 20, 1906. Serial No. 331,271.

*To all whom it may concern:*

Be it known that I, PERRY E. DOOLITTLE, of the city of Toronto, in the Province of Ontario, Canada, have invented certain new and useful Improvements in Demountable Rims, of which the following is a specification.

My object is to devise simple means for carrying pneumatic tires detached in such a condition that they may be very quickly placed in position on and secured to the wheels, and I attain my object by providing the tire with a demountable rim extensible and contractible circumferentially on a fixed rim, means being provided for holding the demountable rim expanded or for releasing it to permit of its contraction on the fixed rim substantially as hereinafter more specifically described, and then definitely claimed.

Figure 1 is a cross-section of a demountable rim constructed in accordance with my invention. Fig. 2 is a cross section of a rim of the type shown in Fig. 3 taken through the lock shown in Fig. 5. Fig. 3 is a cross-section of a modified form of my invention. Fig. 4 is a side elevation, partly in section, of part of the demountable rim shown in Fig. 2. Fig. 5 is an underside plan view showing the construction and arrangement of the lock for the demountable rim. Fig. 6 is a sectional view of the lock for the inner band shown in Fig. 3. Fig. 7 is a plan view of the ends of the inner band shown in Fig. 3.

In the drawings like letters of reference indicate corresponding parts in the different figures.

On referring to the drawings it will be seen that the device comprises three main parts, the tire A, the demountable rim C and the fixed rim E. The tire generally is provided with an inner tube B. The demountable rim is divided transversely and its ends overlapped as shown in Figs. 4 and 5, so that the band may be extended and contracted circumferentially. Means, which I will hereinafter describe, are provided whereby the demountable rim may be held extended or permitted to contract. These means may also be arranged to effect the contraction independent of the air pressure in the tire. The fixed metal rim E is fitted on the wooden felly D.

In Fig. 1 I show a tire of the Dunlop type. In this form the tire is provided with inextensible edges F and the demountable rim C is U-shaped in cross section.

While various means may be provided for holding the demountable rim extended and for permitting it to contract, I prefer the arrangement shown in the details. One end of the demountable rim has a tongue G secured thereto, and the other end of the rim has a grooved part H formed thereon into which the tongue G is fitted as shown. After the tire has been fitted on the demountable rim the parts G and H may be forced apart to extend the rim by means of any suitable tool. To hold it extended I provide a wedge I which may be driven into suitably shaped holes J formed in the fork H and against the end K of the tongue G. The tire may be now fully inflated if desired and carried on the car ready for use. When it is desired to attach it to the wheel it is simply slipped on to the latter from one side, presuming, of course, that the old tire has already been removed. As soon as the demountable rim is in the proper position relative to the fixed rim the wedge I may be withdrawn. The air pressure in the tire will then cause the demountable rim to contract. In some cases this contraction may be sufficient to hold the demountable rim on the fixed rim, but I prefer to provide in the tongue G and part H the holes L and M. When the demountable rim has been contracted by the air pressure or otherwise to make nearly a tight fit on the fixed rim, the holes L and M approximate the position shown in Fig. 5; then by driving in the wedge the fork and the grooved part may be drawn together to draw the holes L and M into alinement when the band will be absolutely tight on the felly. In Fig. 3 I show a tire of the well known standard clencher pattern, the demountable rim C is of course suitably fitted to the base of the tire, but in other respects does not differ from the rim shown in Fig. 1. To prevent side motion of the demountable rim when in place on the fixed rim I provide an annular projection O, which when the demountable rim is expanded will slip over the fixed rim and come into alinement with a slight depression in the fixed rim. When the demountable rim is contracted the projection enters this depression and securely holds the demountable rim in place.

To properly hold the base of the clencher tire in the demountable rim I provide the inner band P divided to make it expansible and contractible and having its ends overlapped. One end is provided with a hole $a$ and the other end with a slot $b$. Through the hole and slot is passed the valve stem Q. A nut or shoulder $c$ is placed or formed on the stem and lies on top of the band P. Below the band is placed a washer $d$ and below the washer a tubular nut $e$ is screwed on the stem. While the tire is deflated the band is readily expanded to permit of the base of the tire being put in place on the demountable rim. When the tire is in place and the demountable rim contracted on the fixed rim the air pressure of the inner tube will have contracted the band and it may be held contracted by tightening up the nut $e$. Then in case of a tire bursting it will still be securely held to the rim by the band. The ends of the band may be corrugated as shown to increase the security of the clamping.

In Figs. 1 and 3 I show a band of compressed fiber $f$ or other slightly elastic material on the fixed rim giving a good frictional grip. This greatly adds to the security of the device, aids in preventing rust in the joint, and prevents noise.

The advantages of my device are many and obvious. In most standard types of tire considerable difficulty is experienced in replacing the tire, owing to the fact that in most cases the tire bases require to be stretched over the rim with which it is engaged. By my construction the tire may be carried with the demountable rim extended so that it may be readily slipped on the fixed rim and subsequently secured in position as described. Further, as the tire and demountable rim when detached form a complete structure the tire may be fully inflated before it is placed in position on the wheel, thus the chauffeur is always aware before he places a new tire on the wheel whether or not it is in proper condition to hold air. In using tires which are normally carried deflated and cannot be properly inflated until placed in position on the wheel, the chauffeur is only able to ascertain whether or not his tire is air tight after he has spent a great deal of time and labor in placing it in position on the wheel. It will be seen too that my tire may be placed in position and removed in a small fraction of the time ordinarily required to replace tires, owing to the fact that there are no bolts employed and that all the labor of stretching a heavy tire into position over a rim of greater diameter than the inner circumference of the tire base is saved. Also, as the fork H and tongue K are on the under side of the demountable rim, they must be received in a recess in the fixed rim and felly. The fastenings of the band are thus entirely within the outer periphery of the fixed rim and completely protected from accidental damage.

What I claim as new and desire to secure by Letters Patent is:—

1. A vehicle wheel provided with an annular demountable rim divided transversely and having its ends overlapped, the said rim having "clencher" side flanges; a tire cover provided with a "clencher" base engaging the aforesaid flanges; an inner expansible and contractible band engaging the "clencher" tire base; and an inner air tube, substantially as described.

2. A vehicle wheel provided with an annular demountable rim divided transversely and having its ends overlapped, the said rim having "clencher" side flanges; a tire cover provided with a "clencher" base engaging the aforesaid flanges; an inner expansible and contractible band engaging the "clencher" tire base, and having its ends overlapped; and means for clamping the ends together, substantially as described.

3. A vehicle wheel provided with an annular demountable rim divided transversely and having its ends overlapped, the said rim having "clencher" side flanges; a tire cover provided with a "clencher" base engaging the aforesaid flanges; an inner expansible and contractible band engaging the "clencher" tire base and having its ends overlapped; and a valve stem adapted to clamp the said ends together, substantially as described.

4. A vehicle wheel provided with an annular demountable rim divided transversely and having its ends overlapped, the said rim having "clencher" side flanges; a tire cover provided with a "clencher" base engaging the aforesaid flanges, an inner expansible and contractible band engaging the "clencher" tire base and having its ends overlapped; a valve stem adapted to clamp the said ends together; and means for clamping together the ends of the outer band, substantially as described.

5. In a vehicle wheel having a demountable rim, the combination of a tire; an annular expansible demountable rim adapted to engage the under side of the base of the tire; a substantially cylindrical faced fixed rim less in circumference externally than the inner face of the demountable rim when the latter is expanded, and having a recess formed therein; and means in permanent operative connection with the demountable rim for releasably holding the latter expanded and which may be released to permit of the demountable rim contracting on the fixed rim, said means being received in the recess in the fixed rim when the tire is in position on the wheel.

6. In a vehicle wheel having a demountable rim the combination of a tire: an annular expansible demountable rim adapted to engage the under side of the base of the tire; a substantially cylindrical faced fixed rim less in circumference externally than the inner face of the demountable rim when the latter is expanded and having a recess formed therein; and means in permanent operative connection with the demountable rim for holding the latter expanded and for contracting the said demountable rim on the fixed rim, the said means being received in the recess in the fixed rim when the tire is in position on the wheel.

7. In a vehicle wheel having a demountable rim the combination of a tire carrying divided annular expansible demountable rim; a substantially cylindrical faced fixed rim less in circumference externally than the inner face of the demountable rim when the latter is expanded; a tongue formed at the under side of one end of the demountable rim; a fork formed at the under side of the other end of the demountable rim to receive the tongue, a hole being formed through the sides of the fork; and a wedge adapted to be driven into said hole to engage the tongue and expand the demountable rim.

8. In a vehicle wheel having a demountable rim the combination of a tire carrying divided annular expansible demountable rim; a substantially cylindrical faced fixed rim less in circumference externally than the inner face of the demountable rim when the latter is expanded; a tongue formed at the under side of one end of the demountable rim; a fork formed at the under side of the other end of the demountable rim to receive the tongue; two holes being formed through the sides of the fork; and a wedge adapted to be driven into said holes to engage the tongue to expand or contract the demountable rim, the tongue being suitably formed for engagement by the wedge.

9. In a vehicle wheel having a demountable rim the combination of a tire carrying metal rim; a felly; an annular recessed metal rim on the felly; and a cushion of comparatively elastic material set in said recess between the felly rim and the tire carrying rim.

10. In a vehicle wheel having a demountable rim the combination of a tire carrying metal rim; a felly; a metal rim on the felly; and a compressed fiber cushion between the rim and the tire carrying rim.

11. Devices for supporting a tire in inflated condition while disassociated from its wheel, said devices comprising a supplemental rim and a removable piece the withdrawal of which permits the inflation pressure of the tire to be transmitted to the periphery of the wheel.

Toronto Canada 13th August 1906.

PERRY E. DOOLITTLE.

Signed in the presence of—
John G. Ridout,
Chs. Baker.